United States Patent [19]

Sgambati

[11] Patent Number: 5,606,443
[45] Date of Patent: Feb. 25, 1997

[54] CONTROL CIRCUIT FOR ENTERTAINMENT SYSTEM DEMONSTRATION

[75] Inventor: William J. Sgambati, Chestnut Ridge, N.Y.

[73] Assignees: Sony Corporation, Tokyo, Japan; Sony Electronics, Inc., Park Ridge, N.J.

[21] Appl. No.: 597,327

[22] Filed: Feb. 6, 1996

Related U.S. Application Data

[63] Continuation of Ser. No. 98,663, Jul. 28, 1993, abandoned.

[51] Int. Cl.$^6$ ................................................ H04B 10/00
[52] U.S. Cl. .................... 359/143; 359/146; 359/148; 340/825.72
[58] Field of Search ..................... 359/142, 143, 359/146, 148, 145, 147; 340/825.69, 825.72, 825.76, 825.24, 825.25

[56] References Cited

U.S. PATENT DOCUMENTS

| | | | |
|---|---|---|---|
| 4,091,272 | 5/1978 | Richter et al. | 359/148 |
| 4,338,632 | 7/1982 | Falater | 340/825.72 |
| 4,386,436 | 5/1983 | Kocher et al. | 340/825.72 |
| 4,718,112 | 1/1988 | Shinoda | 359/148 |
| 4,771,283 | 9/1988 | Imoto | 359/148 |
| 4,802,114 | 1/1989 | Sogame | 359/148 |
| 4,817,203 | 5/1989 | Tsurumoto et al. | 359/148 |
| 4,882,747 | 11/1989 | Williams | 359/148 |
| 4,965,557 | 10/1990 | Schepers et al. | 340/825.72 |
| 5,187,469 | 2/1993 | Evans et al. | 340/825.22 |
| 5,204,768 | 4/1993 | Tsakiris et al. | 359/143 |
| 5,227,780 | 7/1993 | Tigwell | 359/143 |
| 5,255,180 | 10/1993 | Shinoda et al. | 340/825.24 |
| 5,382,947 | 1/1995 | Thaler et al. | 340/825.22 |
| 5,418,527 | 5/1995 | Yashiro | 340/825.72 |

FOREIGN PATENT DOCUMENTS

| | | | |
|---|---|---|---|
| 59-189904 | 4/1986 | Japan | 359/143 |
| 0165296 | 6/1989 | Japan | 359/148 |

OTHER PUBLICATIONS

Realistic Owner's Manual, 8–in–1 Universal Remote Control, 1990 Tandy Corporation.

*Primary Examiner*—Wellington Chin
*Assistant Examiner*—Rafael Bacares
*Attorney, Agent, or Firm*—Jerry A. Miller; Charles J. Kulas

[57] ABSTRACT

A method and apparatus for controlling a demonstration of home entertainment audio and/or video equipment. Upon receipt of a start signal from a switch, control signals are transmitted via infrared transmitter to the equipment being demonstrated. The infrared signals are identical to those which would be sent from a remote control unit (or may be signals sent through hard-wired connections). The infrared signals turn on power to the equipment, properly configure the equipment, adjust volume level and other parameters, and program the equipment to present the demonstration.

29 Claims, 5 Drawing Sheets

CONTROL CIRCUIT FOR ENTERTAINMENT SYSTEM DEMONSTRATION

This is a continuation of application Ser. No. 08/098,663 filed on Jul. 28, 1993 which is hereby incorporated by reference now abandoned.

BACKGROUND

1. Field of the Invention

This invention relates generally to the field of control circuits for controlling electronic equipment. More particularly, this invention relates to a control circuit used for demonstrating electronic audio/video (A/V) entertainment equipment in a retail showroom.

2. Background of the Invention

In displaying and demonstrating electronic equipment for home entertainment systems such as stereo equipment (receivers, amplifiers, tape decks, etc.) and video equipment (video tape recorders, television sets, laser disk players, etc.) difficulties in presenting a high quality demonstration are often encountered by virtue of customers playing with or otherwise changing the settings of the equipment being demonstrated. Thus, when a customer asks a sales representative for a demonstration of a particular set of equipment the sales representative may have difficulty presenting a good quality demonstration. For example, if the demonstration relates to a stereo system, a browsing customer may have previously changed the settings of the stereo receiver to unbalance the various components or reconfigure the source of program material without the knowledge of the sales representative.

As a result, when the sales representative attempts to provide a demonstration to the potential customer, it may appear that the equipment is difficult to operate or otherwise undesirable. In fact, with a proper demonstration the potential customer might have found the same equipment to be quite satisfactory. Therefore, it is advantageous to have a demonstration controller which is easily operated by a sales representative or customer which reliably produces a consistent high quality demonstration of a particular system.

There currently exists demonstration systems in which the customer or sales representative actuates a momentary contact switch which brings the audio level of a particular system to a known level as long as the switch is held in the closed position. However, such a system only provides a partial remedy to the problem since customers who are browsing may still easily unbalance such a system or reconfigure it between demonstrations thus disrupting the quality of the demonstration achieved by activating this switch.

SUMMARY OF THE INVENTION

It is an object of the present invention to provide an improved method and apparatus for demonstrating electronic home entertainment equipment such as audio and video equipment.

It is a feature that the present invention provides a consistent known demonstration program each time a simple activation instruction is received while permitting sales representatives or customers to modify the settings of the equipment.

It is an advantage that the present invention always returns the system to a known state prior to beginning a demonstration.

It is a further advantage of the present invention that multiple modes of operation may be accommodated.

It is another advantage of the present invention that the circuit is simple to implement and software controlled for simplified changes and a high level of versatility.

These and other objects, advantages and features of the invention will become apparent to those skilled in the art upon consideration of the following description of the invention.

The present invention relates to a method and apparatus for controlling a demonstration of home entertainment audio and/or video equipment. Upon receipt of a start signal from a switch, control signals are transmitted via infrared modulated transmitter and/or non-modulated hard wired control connections to the equipment being demonstrated. The infrared signals are identical to those which would be sent from a remote control unit. The infrared signals turn on power to the equipment, properly configure the equipment, adjust volume level and other parameters, and program the equipment to present the demonstration.

An electronic device demonstration controller according to the present invention includes an input for receiving a start signal indicative of starting a demonstration. A transmitter transmission sends control signals to the electronic device. In response to the start signal, the controller sends a configure signal to the transmitter for placing the electronic device in a predetermined configuration suitable for the demonstration and then sends a signal which initiates a demonstration of operation of the electronic device.

A method for demonstrating an electronic device according to the invention includes the steps of: receiving a start signal indicative of starting a demonstration; sending a configure signal to the electronic device which places the electronic device in a predetermined configuration suitable for the demonstration; and sending a signal to the device which initiates a demonstration of operation of the electronic device.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

BRIEF DESCRIPTION OF THE DRAWING

FIG. 4, which is divided into

DETAILED DESCRIPTION OF THE INVENTION

Figure 1:
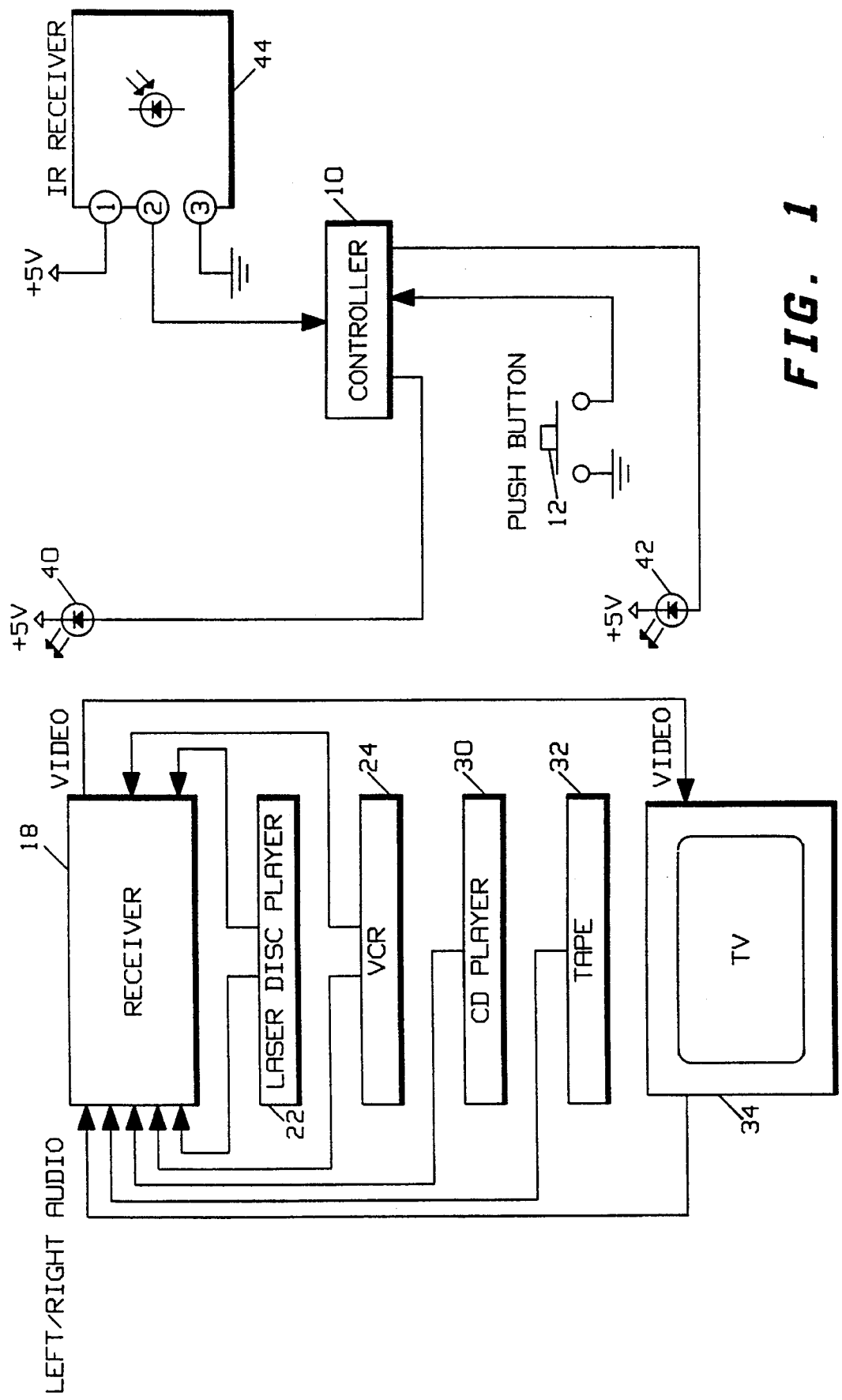
FIG. 1 is a block diagram of a demonstration system according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

Turning now to FIG. 1, an audio/video retail display utilizing the present invention is shown in block diagram form. The demonstration is controlled by a demonstration controller 10. In the present embodiment, controller 10 receives input from a single push button 12. The push button 12 is preferably located adjacent an ideal listening or viewing position. When the user actuates push button 12, a sequence of events is initiated which results in a controlled demonstration being presented. The controller 10 communicates with any suitable arrangement of electronic equipment to be demonstrated. In the example shown, an audio/video receiver 18 receives inputs from a laser disk player 22 as well as a video cassette recorder (VCR 24). The audio/video receiver 18 is also connected to a compact disk (CD) player 30, an audio tape deck 32 and a television 34.

In the example shown, both audio and video signals are provided from VCR 24 and laser disk player 22 to audio/video receiver 18. The video is then routed through the receiver to television set 34 or suitable video monitor as desired. The left and right audio channels (and any other channels) from laser disk player 22, VCR 24, CD player 30 and tape deck 32 are similarly provided to the audio/video receiver 18 which selectively couples an amplified version of their output to a suitable set of audio loudspeakers (not shown).

In order for controller 10 to issue commands to the components just described, the controller 10 drives infrared transmitters 40 and 42 which are aimed to be appropriately received at the various components. Alternatively, the various electronic equipment can be directly connected to the controller 10 by a wired connection (e.g. by a so-called S-control interface as used by Sony Corporation, or similar interfaces used by other manufacturers). In the preferred embodiment, hard wired connections are used in order to obtain more reliable communication between controller 10 and the equipment being controlled. In the event hard wired connections are not possible, it is best if the infrared transmitters 40 and 42 are placed in close proximity to the infrared receivers on the equipment being demonstrated (in fact, direct connection of the transmitters 40 and 42 with the equipment's receivers is desirable). In one mode of operation, the controller 10 also receives infrared signals at an infrared receiver/demodulator 44. The infrared signals received at infrared receiver/demodulator 44 are generated, for example, by a remote control unit operated by the demonstrator. In this mode of operation controller 10 simply serves as a repeater to provide for retransmission of the signals received at receiver/demodulator 44 at infrared transmitters 40 and 42.

According to one embodiment of the present invention a demonstration program might utilize a laser disk player 22 to generate both audio and video signals to be displayed on the television set 34 and reproduced by audio/video receiver 18 respectively. In this example, upon receipt of a closure of push button 12, controller 10 sends signals to the audio/video receiver 18 and laser disk player 22 which causes the audio/video receiver 18 to select the laser disk player 22 as an input source and assures that both the audio/video receiver 18 and laser disk player 22 are turned on. A volume control of audio/video receiver 18 is then adjusted to a suitable sound level and the laser disk player 22 is programmed to output a predetermined demonstration program to audio/video receiver 18 and therethrough to television 34. The demonstration is then initiated so that the user is presented with a predetermined demonstration program at a predetermined sound level without the requirement for an operator to intervene to assure that all switches and controls are appropriately set prior to actuating the demonstration.

Before and after the demonstration, the controller 10 reverts to its repeater mode of operation. In this mode, any signals transmitted from the remote control are received and demodulated by the infrared receiver/demodulator 44 and retransmitted via infrared transmitters 40 and 42 to the various components in the demonstration set-up. In one embodiment of the invention, if the push button 12 is actuated during the demonstration process, it is ignored. In another embodiment, if the push button is actuated during the demonstration, the demonstration sequence begins again from the beginning. Other embodiments will occur to those skilled in the art. Generally, it is desirable to disable the controller's repeater mode of operation during the initialization of the demonstration to avoid interference and assure a reliable initialization to predetermined known state defined by the controller program.

Figure 2:
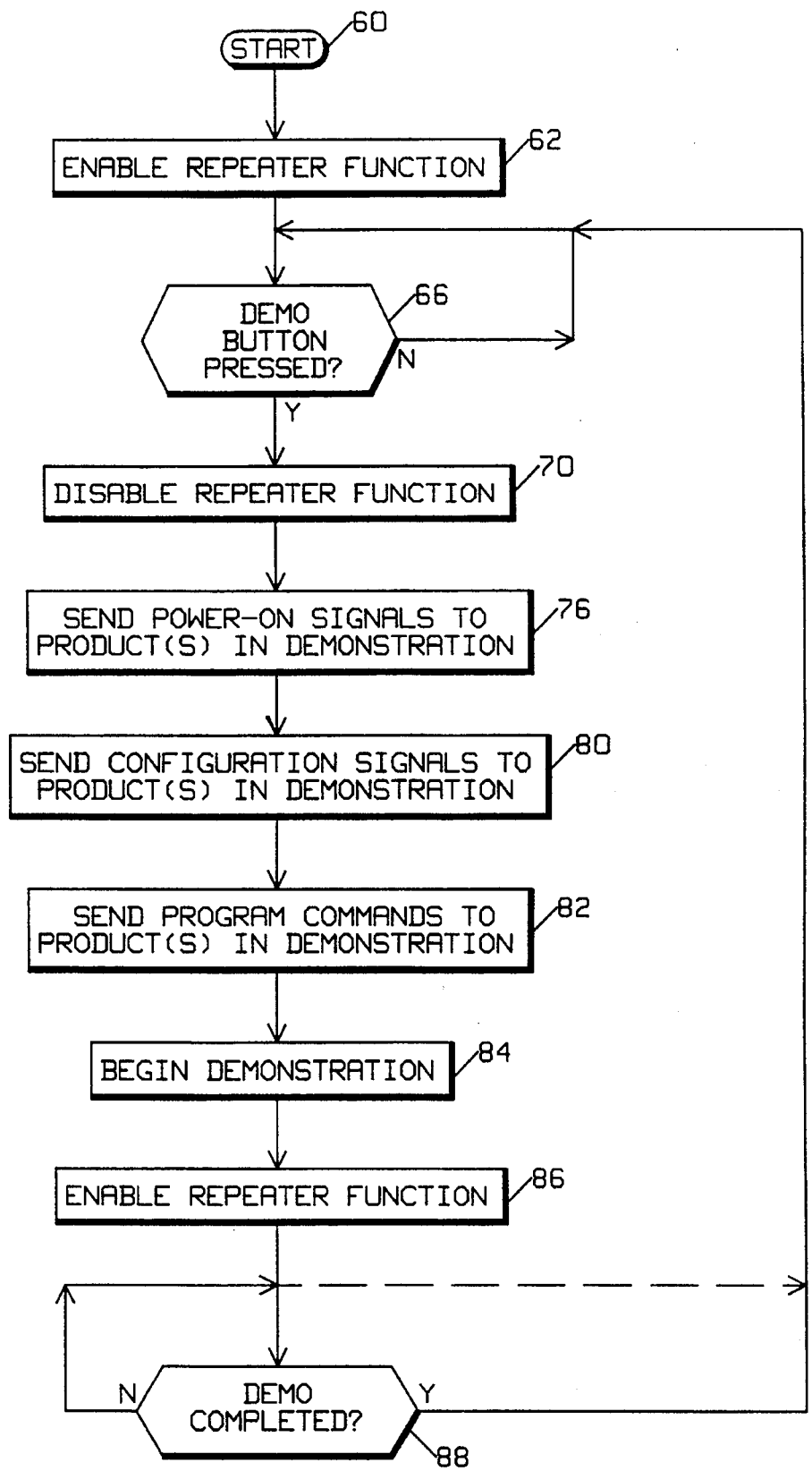
FIG. 2 is a flow chart of the operation of the controller of the present invention.

Referring to FIG. 2, a flow chart of the operation of controller 10 is described starting at step 60 representing power-on of the controller. At step 62 the repeater function is enabled after the system is powered up so that commands issued from a remote control are more easily received by the equipment being demonstrated without need for the remote control to be directly pointed at any particularly component other than the infrared receiver/demodulator 44. If the demonstration push button 12 is pressed at step 66, the repeater function of controller 10 is disabled at step 70. Otherwise, controller 10 simply loops at step 66 awaiting actuation of push button 12.

Once the repeater function is disabled at step 70, control passes to step 76 where power-on signals are transmitted via infrared transmitters 40 and 42 (or hard wired control connections) to the various product or products being used in the demonstration to assure these products are switched on. At step 80 various configuration signals are transmitted via infrared transmitters 40 and 42 (or hard wired connection) to the components in order to select the appropriate video modes for audio/video receiver 18 and television 34 as well as the appropriate audio mode for audio components in this system. For example, at step 80, the program source is selected at the audio video receiver 18 and the television 34. Also during this step, the audio/video receiver 18's volume is turned all the way down in the present embodiment to provide a known reference point for later adjustment to a desired listening level.

At step 82, the electronic components used in the demonstration may be programmed by transmission of programming signals from controller 10 if this is a desired part of the demonstration. For example, if the demonstration is to be carried out with the laser disk player 22, the laser disk player could be programmed to play particular segments, e.g. tracks 5 and 9, of a laser disk repeatedly. After any such programming, the audio/video receiver 18's volume control is increased to the desired volume level and the demonstration begins at step 84. In this embodiment, the volume level is controlled by sending a code from controller 10 which increases the volume for a predetermined time period which corresponds to a desired volume setting.

Control then passes to step 86 where the repeater function is enabled so that modifications of the demonstration can be carried out by remote control commands issued by the operator. At step 88, when the demonstration ends, control is passed back to step 66 which awaits the next actuation of the demonstration push button 12. Otherwise, according to the present embodiment, control passes back to the entry point of step 88 where the system loops until the demonstration is completed. In the preferred embodiment, a continuous demonstration is programmed at step 82. Thus, there is no need for step 88 which is omitted in favor of the direct path shown by the broken line bypassing step 88.

In other embodiments, the end of a demonstration can be detected in a number of ways, if desired. For example, the demonstration can be timed, or the end of a segment played by a tape deck, or laser disk player can be detected by hard wired connections thereto. Other techniques will occur to those skilled in the art.

In some instances it is desirable for the demonstration to operate continuously until interrupted by commands received by infrared receiver/demodulator 44. In this instance, the program source (e.g. laser disk player 22) can be programmed to repeat forever. In this instance the demonstration will not end absent human intervention or disruption of power. Alternatively, controller 10 can be programmed to repeat the demonstration sequence at timed intervals or at the end of each demonstration. In other embodiments, actuation of the demonstration push button 12 while the demonstration is in progress can be programmed to end the demonstration. Still other embodiments will occur to those skilled in the art.

According to one embodiment of the present invention, controller 10 can receive inputs from a plurality of push buttons similar to push button 12. In this embodiment, each push button could represent a different demonstration. For example, actuation of push button number 1 could provide an audio/visual demonstration of the laser disk player 22 operation. Actuation of a push button number 2 could result in a demonstration of CD player 30 playing audio source material, and so on. In the hardware embodiment of controller 10 to be described, a total of 6 such programs can be implemented, but this is not to be limiting.

Figure 3:
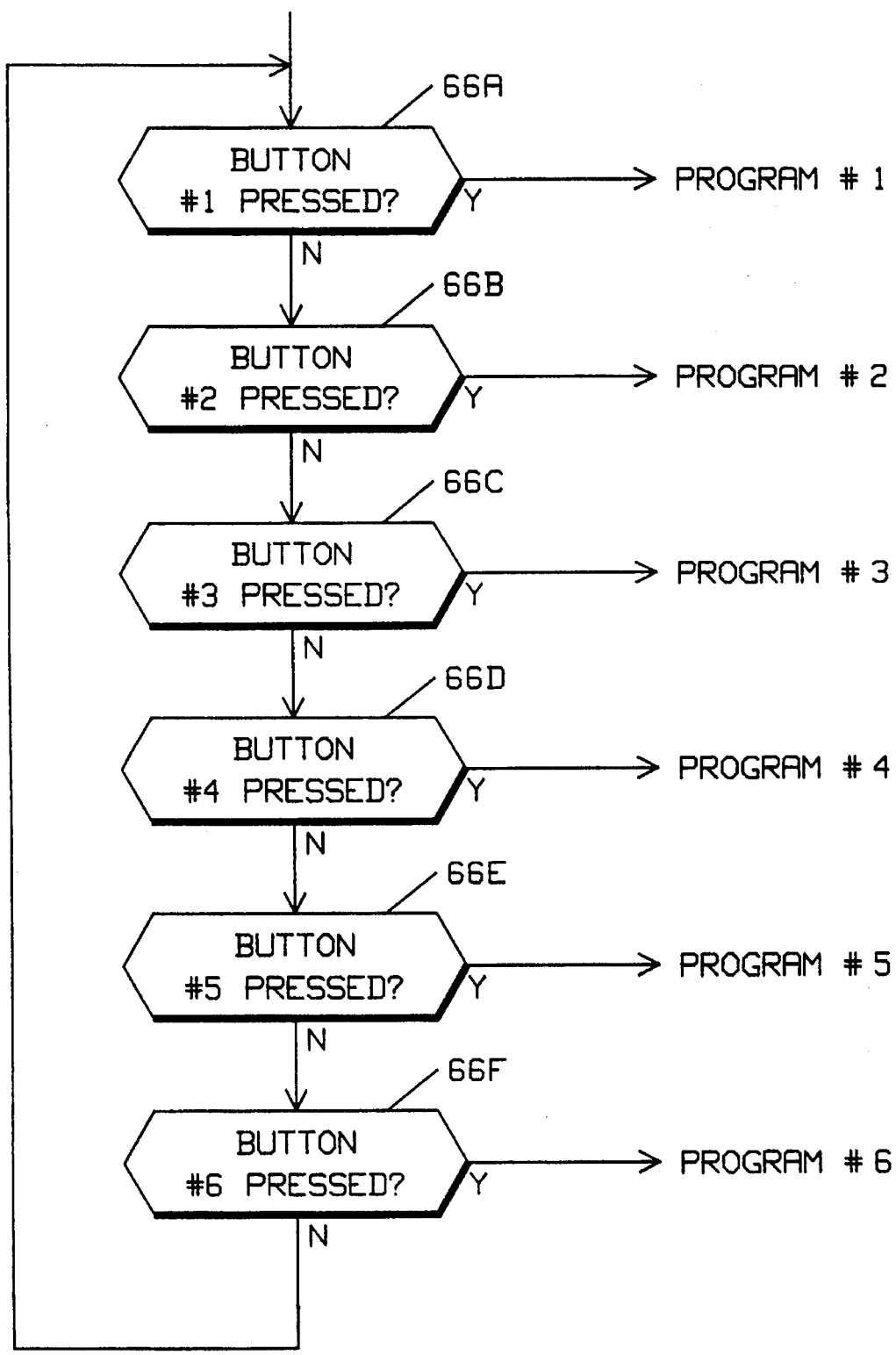
FIG. 3 shows a flow chart of the modification to the operation described by FIG. 2 if multiple switches are used.

When more than one program is possible, a control routine such as that of FIG. 2 may be used in the controller 10 program. In this routine, step 66 of FIG. 2 is replaced by 66A, 66B, 66C, 66D, 66E and 66F of FIG. 3. Thus, if push button number 1 is pressed at step 66A a first sequence of programmed steps (such as steps 70 through 92 as previously described) are carried out. In a similar fashion a second set of programmed steps are carried out if button number 2 is pressed at 66B. Those skilled in the art will appreciate that any number of such programs could be implemented in accordance with the present invention. Six possible programs are accommodated by the present embodiment using simple circuitry without need for any sort of coding of the push button inputs. However, by appropriately encoding the push buttons or other suitable input source, any suitable number of programs could be implemented.

Figure 4A:
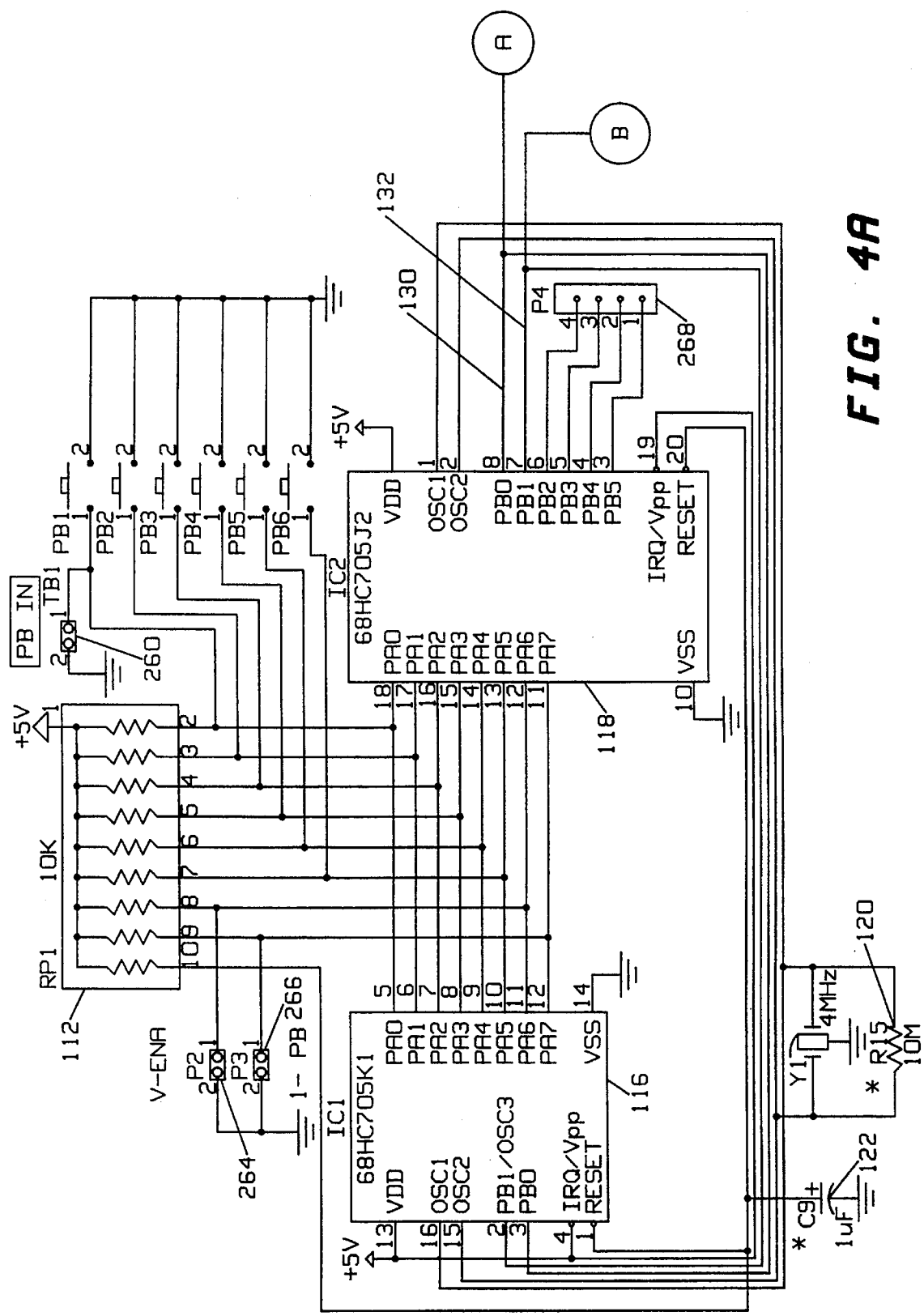
FIGS. 4A AND 4B, is a schematic diagram of the controller of the present invention.
Figure 4B:
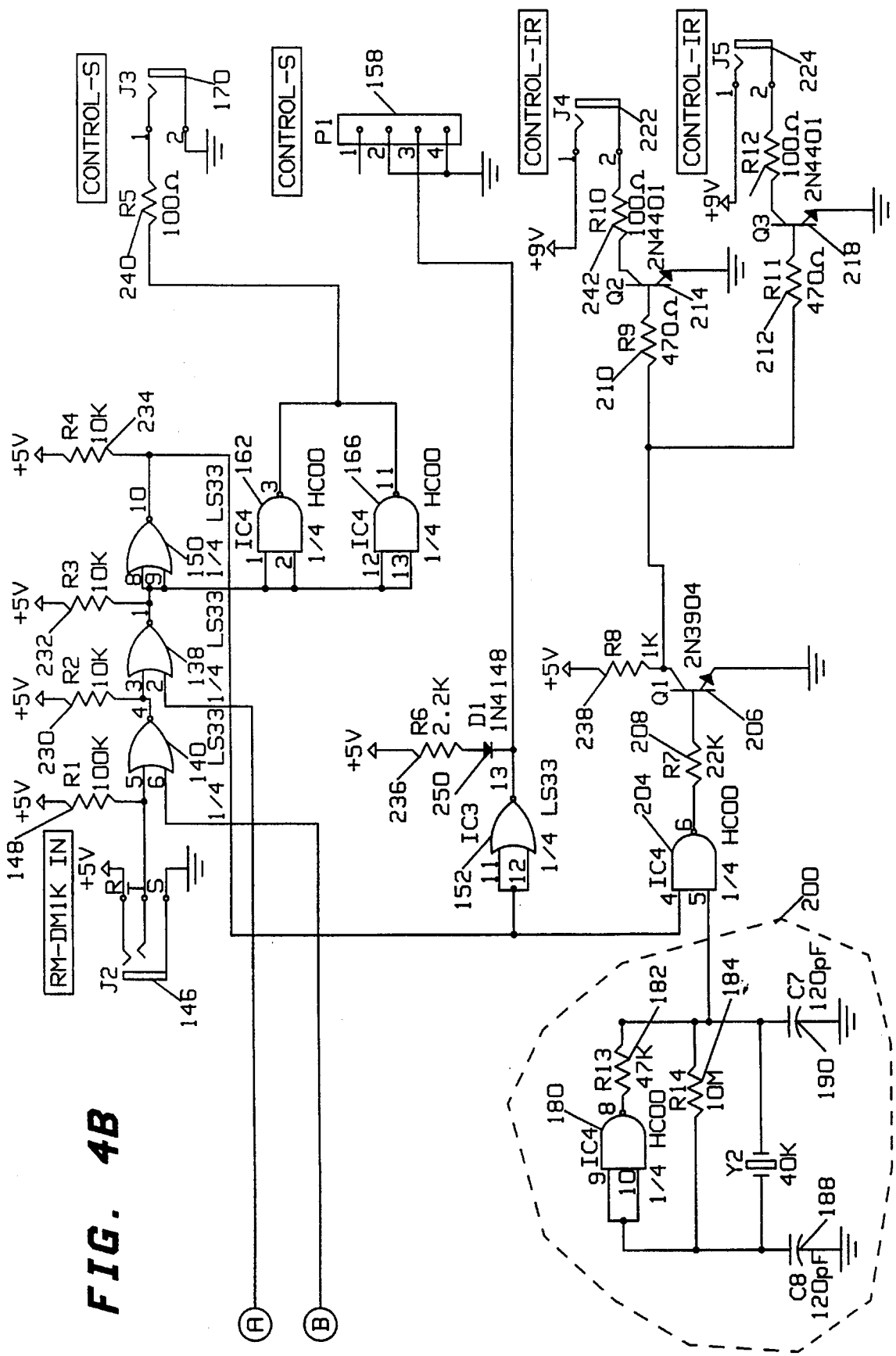

Referring now to FIG. 4 (made up of FIG. 4A and FIG. 4B), a circuit diagram of the controller 10 of the present invention is shown in detail. In this embodiment, 6 push button switches are shown as PB1 through PB6. One terminal of each normally open momentary contact switch PB1 through PB6 is connected to ground while the other terminal of PB1 through PB6 is connected through a pull-up resistor from pull-up resistor bank 112 to the supply voltage. The junction of each pull-up resistor and switch is connected to one line of the input bus of a microcontroller 116 or 118.

Provisions are made in the present controller 10 to accommodate one or the other of microcontrollers 116 or 118 but not both simultaneously. Thus, either microcontroller 116 or microcontroller 118 should not be connected to the circuit board. The switches PB1 through PB6 are connected directly to terminals of the input bus of the microcontroller 116 or 118 which may provide switch debounce functions with appropriate programming. In the preferred embodiment, a 68HC05 series microcontroller manufactured by Motorola Inc. is preferred, but other suitable microcontrollers or general purpose processors may be used. Where only a small number of programming steps are required, microcontroller 116 is utilized (e.g. 68HC705K1). However, if a larger number of program steps are required for a more complex demonstration, a microcontroller 118 (e.g. 68HC705J2) having a larger internal program memory is utilized.

A 4 MHz clock signal is provided by connecting crystal Y1 across the oscillator terminals of the microcontroller. In the event microcontroller 118 is used, a 10M resistor 120 is connected across the terminals of Y1, and a 1 μF capacitor is connected to the reset line of the microcontroller 122 (to provide a power-up reset).

The output of the microcontroller 116 or 118 is extracted from the output bus lines 130 and 132 according to the present embodiment. Lines 130 and 132 are each connected to 1 input of 2 input open collector output NOR gates 138 and 140 respectively. The output of NOR gate 140 is connected to the other input of NOR gate 138. The second input of NOR gate 140 is connected to a jack 146. Jack 146 is used to connect infrared receiver/demodulator 44 to the controller 10. Thus, either inputs from infrared receiver/demodulator 44 or signals generated by controllers 116 or 118 appear at the output of NOR gate 138. If nothing is connected to jack 146, the input to NOR gate 140 connected to jack 146 is held at a logic high by pull-up resistor 148.

Output line 132 is used to either enable or disable the repeater function of controller 10. By application of a suitable logic signal to the input of NOR gate 140, signals received from infrared receiver 44 are inhibited from passage to the input of NOR gate 138. That is, by applying a logic 1 to the input of NOR gate 140 from bus line 132, signals received through jack 146 are inhibited from passage through NOR gate 140. Control signals are generated at bus line 130 and transmitted to NOR gate 138. The output of NOR gate 138 passes through a pair of inverters 150 and 152 (fabricated of spare NOR gates) to a connector 158. In order to properly control Sony brand equipment, inverter 152 driving the connector 158 should be an open collector gate. For other types of control interfaces, other types of interface circuits may be required. Connector 158 can be hard-wired directly to certain electronic components for direct control without utilization of infrared signals. In a similar manner, the output of NOR gate 138 passes through a pair of parallel connected inverters 162 and 166 (fabricated from spare CMOS NAND gates) to a jack 170 for direction to various components. The CMOS gates 162 and 166 are connected in parallel to increase the load driving ability at jack 170.

An oscillator is fabricated from CMOS invertor 180 connected in series with a resistor 182 and having a resistor 184 and a 40 KHz crystal Y2 connected in parallel. Capacitors 188 and 190 are connected from the crystal terminals to ground. The output of oscillator 200 is used to modulate the control or configuration signals issued by microcontroller 116 or microcontroller 118 to produce appropriate infrared control signals to control Sony brand equipment in the preferred embodiment. The control signal from the microcontroller is taken from the output of NOR gate 150 and modulated by application to one input of a NAND gate 204 with the output of oscillator 200 coupled to the other input of NAND gate 204. The output of NAND gate 204 drives the base of a transistor 206 through resistor 208. The collector of transistor 206 is connected through resistors 210 and 212 to the base of transistors 214 and 218 respectively. Transistors 214 and 218 then drive infrared transmitters 40 and 42 through jacks 222 and 224 respectively.

Depending upon the family of logic devices used, pull-up resistors such as 230, 232, 234 and 236 and 238 may be needed at the gate outputs as will be understood by those skilled in the art. Also, series resistors 240, 242 and 244 are used to provide short circuit over-current protection in the event of a short at the jacks 170, 222 and 224 respectively. Diode 250 is used to block current to control circuit 10 from some audio/video components which may provide 5 Volts bias voltage at the control interface.

In the preferred embodiment, a single push button 12 is used which is connected to a terminal pair 260. Three other sets of electrical terminals 264, 266 and 268 are also provided. Terminals 264 and 266 are connected to the two remaining input bus lines of the microcontroller 116 or 118 and can be used for establishing one of four predetermined volume settings in the preferred embodiment. Terminal 268 is connected to the remaining input/output bus lines of the microcontroller 118 and can be used for additional push buttons, switches, status LED's or signals from audio/video components indicating completion of a demonstration (e.g. end of tape, etc.).

While the present invention has been disclosed in an embodiment using a programmed microcontroller 116 or 118 in conjunction with various logic circuits and other components, an equivalent hard wired logic could be used instead of programmed microcontrollers if desirable. Other embodiments could be devised by those skilled in the art. In addition, the component values shown in FIG. 4 are those used in the preferred embodiment, but are not intended to be limiting.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An electronic system, comprising in combination:

a first electronic device outputting an electrical signal;

a second electronic device coupled to said first electronic device for selectively receiving and outputting said electrical signal;

a remote control device operated by a user for generating remote control signals;

a remote control receiver for receiving said remote control signals;

a relay transmitter for retransmitting said received remote control signals to said electronic devices;

a device demonstration controller comprising:

input means for receiving a start signal indicative of starting a demonstration of said electronic system;

first control signal transmission means for sending a first control signal to said first electronic device, wherein said first electronic device outputs said electrical signal in response to said first control signal;

second control signal transmission means for sending a second control signal to said second electronic device, wherein said second electronic device selects said electrical signal and outputs a signal derived from said electrical signal; and retransmission inhibiting means coupled between said remote control receiver and said relay transmitter for inhibiting said retransmission of said remote control signals for a period of time after said first and second control signals have been sent to said first and second electronic devices.

2. The apparatus of claim 1, wherein said input means includes means for detecting actuation of a switch.

3. The apparatus of claim 1, further including a microcontroller and wherein said control means includes a programmed microcontroller.

4. The apparatus of claim 1, wherein said input means includes a momentary contact switch coupled to an input bus line of said microcontroller.

5. The apparatus of claim 1, wherein said transmission means includes a hard wired connection to said electronic device.

6. The apparatus of claim 3, wherein said transmission means includes:

modulating means for modulating a signal from said microcontroller; and an infrared transmitter receiving said modulated signal.

7. The apparatus of claim 6, wherein said modulating means further includes a 40 Khz oscillator.

8. The apparatus of claim 1, wherein said remote control receiver includes an infrared receiver; and wherein said relay transmitter includes an infrared transmitter coupled to said infrared receiver, wherein said infrared receiver receives external infrared signals from said remote control device and sends said external infrared signals to said relay inhibiting means for retransmission to said electronic device.

9. The apparatus of claim 3, wherein said microcontroller includes a plurality of inputs, and further comprising a plurality of input switches each coupled to one of said inputs.

10. The apparatus of claim 1, wherein said control means sends a power-on signal to said transmission means for turning on power to said electronic device prior to sending said configure signal.

11. The apparatus of claim 1, wherein said configure signal selects a source of input program.

12. The apparatus of claim 1, wherein said configure signal selects an audio volume level.

13. The apparatus of claim 1, further comprising means for detecting a demonstration end point.

14. An electronic device demonstration controller for controlling an electronic system, wherein said electronic system includes a first electronic device outputting an electrical signal and second electronic device coupled to said first electronic device for selecting and outputting said electrical signal, the electronic device demonstration controller comprising in combination:

a momentary contact switch;

input means for receiving a star signal generated by actuation of said switch indicative of starting a demonstration of said electronic device;

control means, including a programmed microcontroller;

transmission means for sending control signals to said electronic system, said transmission means including:

oscillating means for producing a 40 KHz oscillator signal;

modulating means for modulating a signal from said microcontroller with said oscillator signal; and an infrared transmitter receiving said modulated signal for generating infrared signals derived from said modulated signal;

said control means futher comprising:
 a power-on signal coupled to said transmission means for turning on power to said first and second electronic devices;
 means for sending a configure signal to said transmission means for placing said first electronic device in a predetermined demonstration configuration for said demonstration, including means for causing said first electronic device to output said electrical signal;
 means for sending a configure signal to said transmission means for placing said second electronic device in a predetermined configuration for said demonstration, including means for causing said second electronic device to select said electrical signal and to output a signal derived from said electrical signal;
 means for sending a signal to said transmission means which initiates said demonstration of operation of said electronic system;
 an infrared receiver, coupled to said infrared transmitter, for receiving external infrared signals to be retransmitted by said infrared transmitter to said first and second electronic devices in a repeater mode of operation; and
 retransmission inhibiting means coupled between said infrared receiver and said infrared transmitter for inhibiting said retransmission of said remote control signals for a period of time after said configure signals have been sent to said first and second electronic devices.

15. A method for demonstrating an electronic system, wherein said electronic system includes a first electronic device outputting an electrical signal and a second electronic device coupled to said first electronic device for selecting and outputting said electrical signal, wherein said system further includes a controller for controlling said electronic devices in said system, wherein said system further includes a remote control device operated by a human user for generating signals to control said electronic system, said method comprising the steps of:
 receiving at the controller a start signal indicative of starting a demonstration of said electronic system;
 sending from the controller a configure signal to said electronic system causing said first electronic device to output said electrical signal and causing said second electronic device to select and output said electrical signal; and
 sending a signal to said electronic system which initiates said demonstration of operation of said electronic system
 subsequent to said receiving step, inhibiting said signals from said remote control device from controlling said electronic devices for a period of time.

16. The method of claim 15, further comprising the step of sending a power-on signal to said electronic device for turning on power to said electronic device in response to said start signal.

17. The method of claim 15, wherein said sending steps include sending infrared signals.

18. The method of claim 15, wherein said sending steps include sending signal signals via a hard wired connection.

19. The method of claim 15, further comprising the step of sending a signal for controlling an audio volume level.

20. A demonstration controller for controlling a demonstration of an audio/video system, said system including a plurality of interconnected audio/video components, each audio/video component providing a distinct function to the audio/video system, wherein a first audio/video component outputs an electrical signal to a second audio/video component, wherein a second audio/video component selects and outputs said electrical signal from among a plurality of signal inputs, wherein said demonstration controller is responsive to remote control signals from a remote control device to control the plurality of said interconnected audio/video components, said demonstration controller comprising in combination:
 input means for receiving a start signal from said remote control unit indicative of starting said demonstration of audio/video system;
 transmission means for sending control signals to said plurality of audio/video components;
 control means responsive to said start signal for:
  sending a configure signal to said transmission means for placing each of said audio/video components in a predetermined demonstration configuration for said demonstration, including causing said first audio/video component to output said electrical signal and causing said second audio/video component to select and output said electrical signal; and
  sending a signal to said transmission means which initiates said demonstration of operation of said audio/video system
 retransmission inhibiting means for inhibiting said remote control signals from said remote control device for a period of time after said configure signals have been sent.

21. The apparatus of claim 20, wherein said transmission means includes a hard wired connection to said plurality of audio/video components.

22. The apparatus of claim 20, wherein said transmission means includes an infrared connection to said plurality of audio/video components.

23. A demonstration controller for controlling a demonstration of an audio/video system, said system including a plurality of interconnected audio/video components, each audio/video component providing a distinct function to the audio/video system, wherein a first audio/video component generates an electrical signal, wherein a second audio/video component selects said electrical signal from among a plurality of signals and outputs the selected signal, the demonstration controller comprising in combination:
 a switch;
 input means for receiving a start signal generated by actuation of said switch, said signal being indicative of starting a demonstration of said audio/video system;
 control means, including a programmed microcontroller;
 transmission means for sending control signals to each component of said audio/video system, said transmission means including:
  an oscillator producing a 40 KHz oscillator signal;
  a modulator for modulating a signal from said microcontroller with said oscillator signal; and
  an infrared transmitter receiving said modulated signal;
 said control means being responsive to said start signal for:
  sending a power-on signal to said transmission means for turning on power to each said audio/video component;
  sending a configure signal to said transmission means for placing each said audio/video component in a predetermined demonstration configuration for said demonstration, said configure signal selecting an audio volume level and a source of program material, said configure signal further causing said first audio/video component to output said electrical signal and causing said second audio/video signal to select and output said electrical signal;

sending a signal to said transmission means which initiates said demonstration of operation of said audio/video system; and an infrared receiver coupled to said infrared transmitter for receiving external infrared signals to be retransmitted by said infrared transmitter to each component of said audio/video system in a repeater mode of operation retransmission inhibiting means coupled between said infrared receiver and said infrared transmitter for inhibiting said retransmission of said remote control signals for a period of time after said one or more configure signals have been sent to said first and second electronic devices.

24. The method of claim 16, further comprising the step of sending a command to said electronic devices to select a predetermined audio program to be played by said first electronic device, wherein said electrical signal is derived from said predetermined audio program.

25. The method of claim 16, further comprising the step of sending a command to said electronic devices to select a predetermined audio/video program to be played by said first electronic device, wherein said electrical signal is derived from said predetermined audio/video program.

26. The method of claim 24, wherein said controller has a repeater mode for relaying remote control signals generated by an outside signal source for remotely controlling one or more devices in said electronic system, the method further comprising the steps of:

placing the controller in the repeater mode prior to the step of receiving at the controller a start signal;

disabling the repeater mode subsequent to the step of receiving at the controller a start signal; and placing the controller in the repeater mode at the completion of the demonstration.

27. The method of claim 15, wherein said signals from said remote control device are inhibited for the duration of a demonstration program.

28. The method of claim 15, wherein said signals from said remote control device are inhibited for a predetermined length of time.

29. The method of claim 15, wherein said period of time for inhibiting said signals from said remote control device is determined by a user of the demonstration system.

* * * * *